United States Patent
Bradstreet

(10) Patent No.: US 11,982,761 B2
(45) Date of Patent: May 14, 2024

(54) METHOD FOR CALIBRATING A PHASED ARRAY

(71) Applicant: SRC, Inc., North Syracuse, NY (US)

(72) Inventor: Lance M. Bradstreet, Clay, NY (US)

(73) Assignee: SRC, Inc., North Syracuse, NY (US)

( * ) Notice: Subject to any disclaimer, the term of this patent is extended or adjusted under 35 U.S.C. 154(b) by 514 days.

(21) Appl. No.: 17/354,604

(22) Filed: Jun. 22, 2021

(65) Prior Publication Data
US 2022/0404462 A1    Dec. 22, 2022

(51) Int. Cl.
*G01S 7/40* (2006.01)
*G01S 13/66* (2006.01)
*H01Q 3/26* (2006.01)

(52) U.S. Cl.
CPC .......... *G01S 7/4004* (2013.01); *G01S 13/66* (2013.01); *H01Q 3/267* (2013.01)

(58) Field of Classification Search
CPC ........ G01S 7/4004; G01S 13/66; H01Q 3/267
See application file for complete search history.

(56) References Cited

U.S. PATENT DOCUMENTS

| | | | | |
|---|---|---|---|---|
| 4,201,987 A | * | 5/1980 | Tricoles | G01R 29/10 343/703 |
| 4,453,164 A | * | 6/1984 | Patton | H01Q 3/267 342/372 |
| 7,119,739 B1 | * | 10/2006 | Struckman | G01R 29/10 342/372 |
| 2020/0083967 A1 | * | 3/2020 | Garcia | H04B 17/102 |
| 2022/0407611 A1 | * | 12/2022 | Hou | H01Q 3/267 |

FOREIGN PATENT DOCUMENTS

| CN | 107783086 A | * | 3/2018 | ............ G01S 7/021 |
|---|---|---|---|---|
| CN | 112904095 A | * | 6/2021 | |

* cited by examiner

*Primary Examiner* — Freshteh N Aghdam
(74) *Attorney, Agent, or Firm* — Jonathan L. Gray

(57) ABSTRACT

A method for calibrating a phased array including an antenna array comprising a plurality of antenna elements, comprising the steps: measuring with a probe a first antenna element pattern of a first antenna element of the plurality of antenna elements; performing a spherical near-field to far-field transformation of the first antenna element pattern; transforming the far-field first antenna element pattern to a plane-wave spectrum; back transforming the plane-wave far-field first antenna element pattern to a reference point within the near-field of the antenna array; normalizing the first antenna element pattern according to, at least, the value at the phase center of the plane-wave near-field first antenna element pattern; and calibrating the first antenna element based, at least in the part, on the normalized first antenna element pattern.

18 Claims, 7 Drawing Sheets

METHOD FOR CALIBRATING A PHASED ARRAY

FIELD OF THE INVENTION

The present disclosure is generally related to a method for calibrating a phased array.

BACKGROUND

Phased arrays are commonly used in commercial and military settings for purposes of identifying and tracking a particular target within a particular geometric field of interest. Phased arrays operate by applying progressive phasing to antenna elements of an antenna array to steer a beam, through constructive and destructive interference, in a desired direction.

In order to provide for accurate identification and tracking of such a phased array target, phased arrays require calibration. More specifically, each antenna element, either on transmit or on receive, will have some associated path along which the signal to be transmitted is generated and appropriately conditioned or along which the received signal is downconverted and processed. This path might feature waveform generators (e.g., local oscillators), mixers, amplifiers, cables, connectors, etc., varieties in which result in non-uniform signals provided to the antenna elements of the antenna array, before any phasing is applied. Stated differently, there will be some difference in amplitude or phasing of the signal at each antenna element resulting from differences in the path to each antenna element. Accordingly, to account for these varieties in path length and component behavior, it is necessary to calibrate each element of the antenna array for each phased array before any phasing is applied for beam steering.

Such calibration of a phased array is often accomplished by measurement of antenna performance in a phased array test range, such as but not limited to an anechoic chamber or a test range. However, calibrating the far field of many medium to large phased arrays would require a test range the size of a soccer field or more. It is desirable, therefore, to estimate the far-field characteristics of any arbitrary antenna array according to the measured near-field characteristics, in order to calibrate the antenna element.

Further, performing calibrations on a planar array typically involved placing a probe a known distance from each element and measuring the pattern of the element under test. If, however, the array is a conformal array, measured, for example, within a spherical chamber, this process becomes more difficult as the geometry of the probe to each element varies from element to element. Accordingly, there exists a need in the art to calibrate a conformal array, or any type of array, without requiring positioning the probe directly in front of each element.

SUMMARY

Various aspects of the invention can be combined in any way technically possible.

A method for calibrating a phased array including an antenna array comprising a plurality of antenna elements, comprising the steps: measuring with a probe a first antenna element pattern of a first antenna element of the plurality of antenna elements; performing a spherical near-field to far-field transformation of the first antenna element pattern to yield a far-field first antenna element pattern; transforming the far-field first antenna element pattern to a plane-wave spectrum to yield a plane-wave far-field first antenna element pattern; back transforming the plane-wave far-field first antenna element pattern to a reference point within the near-field of the antenna array to yield a plane-wave near-field first antenna element pattern, wherein the reference point within the near-field is selected such that a value at a phase center of the plane-wave near-field first antenna element pattern is representative of a voltage source of the first antenna element; normalizing the first antenna element pattern according to, at least, the value at the phase center of the plane-wave near-field first antenna element pattern to yield a normalized first antenna element pattern; and calibrating the first antenna element based, at least in the part, on the normalized first antenna element pattern.

The method of claim 1, wherein the first antenna element pattern is normalized according to the value at the phase center of the plane-wave near-field first antenna element pattern and a value of a phase center of a plane-wave near-field second antenna element pattern of a second antenna element of the plurality of antenna elements to yield the normalized first antenna element pattern.

The method of claim 1, wherein calibrating the first antenna element comprises adjusting an attenuator associated with the first antenna element.

The method of claim 1, wherein calibrating the first antenna element comprises adjusting a phase shifter associated with the first antenna element.

The method of claim 1, further comprising the step of, before the step of back transforming, re-referencing the far-field first antenna element pattern, through a set of phase shifts, such that the plane-wave near-field first antenna element pattern is disposed at a point in space at which a value exists.

The method of claim 5, wherein the point in space is a coordinate origin.

A method for calibrating a phased array including an antenna array comprising a plurality of antenna elements, comprising the steps: measuring with at least one probe a plurality of antenna element patterns, each antenna element pattern being produced by a respective antenna element of the plurality of antenna elements; performing a spherical near-field to far-field transformation of each of the plurality of antenna element patterns to yield a plurality of far-field antenna element patterns; transforming each of the plurality of far-field antenna element patterns to a plane-wave spectrum to yield a plurality of plane-wave far-field antenna element patterns; back transforming each of the plane-wave far-field antenna element pattern to a reference point within the near-field of the antenna array to yield a plurality of plane-wave near-field first antenna element patterns, wherein the reference point within the near-field is selected for each of the near-field antenna element patterns such that a value at a phase center of each plane-wave near-field antenna element pattern is representative of a voltage source of the respective antenna element of the plurality of antenna elements; selecting, as a reference value, a value at a phase center of a plane-wave near-field antenna element pattern of the plurality of plane-wave near-field antenna element patterns; normalizing each of the plurality of antenna element patterns according to, at least, the reference value to yield a plurality of normalized antenna element patterns; and calibrating each antenna element based, at least in the part, on a respective normalized antenna element pattern of the plurality antenna patterns.

The method of claim 7, wherein each of the plurality of antenna element pattern is normalized according to the reference value and the value at the phase center of the respective plane-wave near-field antenna element pattern to yield the plurality of normalized antenna element patterns.

The method of claim 7, wherein calibrating each antenna element comprises adjusting an attenuator associated with the antenna element.

The method of claim 7, wherein calibrating each antenna element comprises adjusting a phase shifter associated with the antenna element.

The method of claim 7, further comprising the step of, before the step of back transforming, re-referencing each of the plurality of far-field antenna element patterns, through a set of phase shifts, such that each plane-wave near-field first antenna element pattern is disposed at a point in space at which a value exists.

The method of claim 11, wherein the point in space is a coordinate origin.

A non-transitory storage medium storing program code that, when executed by a processor, calibrates a phased array including an antenna array comprising a plurality of antenna elements, comprising the steps: receiving, from a probe, a measurement representing a first antenna element pattern of a first antenna element of the plurality of antenna elements, performing a spherical near-field to far-field transformation of the first antenna element pattern to yield a far-field first antenna element pattern; transforming the far-field first antenna element pattern to a plane-wave spectrum to yield a plane-wave far-field first antenna element pattern; back transforming the plane-wave far-field first antenna element pattern to a reference point within the near-field of the antenna array to yield a plane-wave near-field first antenna element pattern, wherein the reference point within the near-field is selected such that a value at a phase center of the plane-wave near-field first antenna element pattern is representative of a voltage source of the first antenna element; normalizing the first antenna element pattern according to, at least, the value at the phase center of the plane-wave near-field first antenna element pattern to yield a normalized first antenna element pattern; and calibrating the first antenna element based, at least in the part, on the normalized first antenna element pattern.

The non-transitory storage medium of claim 13, wherein the first antenna element pattern is normalized according to the value at the phase center of the plane-wave near-field first antenna element pattern and a value of a phase center of a plane-wave near-field second antenna element pattern of a second antenna element of the plurality of antenna elements to yield the normalized first antenna element pattern.

The non-transitory storage medium of claim 13, wherein calibrating the first antenna element comprises adjusting an attenuator associated with the first antenna element.

The non-transitory storage medium of claim 13, wherein calibrating the first antenna element comprises adjusting a phase shifter associated with the first antenna element.

The non-transitory storage medium of claim 13, further comprising the step of, before the step of back transforming, re-referencing the far-field first antenna element pattern, through a set of phase shifts, such that the plane-wave near-field first antenna element pattern is disposed at a point in space at which a value exists.

The non-transitory storage medium of claim 17, wherein the point in space is a coordinate origin.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1:
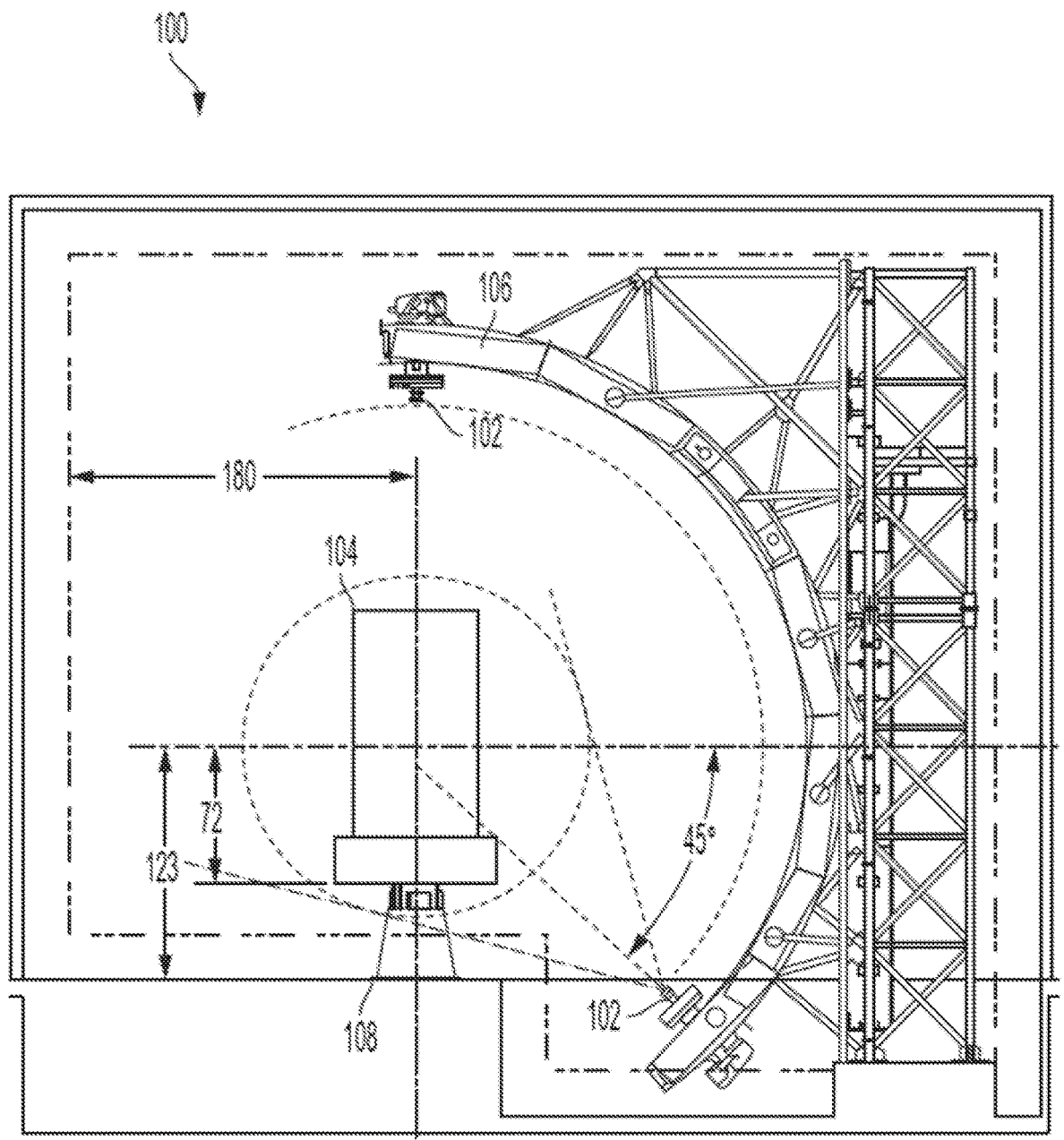
FIG. 1 depicts a schematic of a phased array calibration apparatus, according to an example.

FIG. 1 depicts a phased array calibration apparatus 100, which comprises at least one probe 102 disposed within the near field of a phased array 104, comprising an antenna array formed from a plurality of antenna elements. As shown in FIG. 1, phased array 104 is cylindrical, but in alternative examples, phased array 104 can be any arbitrary shape, such as cylindrical with a conical top or planar.

Generally speaking, probe 102 is positioned with respect to phased array 104 such that the near-field characteristics of all antenna elements can be measured. Typically, for a planar array, probe 106 can be positioned in one location to measure all elements, as long as the location selected offers acceptable SNR for each element. Alternatively, for planar arrays or for arrays of other geometries, the array can be rotated and/or shifted, or the probe itself moved so that probe can measure each element with acceptable SNR. For example, as shown in FIG. 1, probe 102 can positioned on an arch allowing the probe to move to different positions on the arch and the array can be rotated on a positioner 108.

For the purposes of this disclosure, the near field are the fields within finite range, while the far field is designated at infinity. Practically speaking, probe 102 is typically located within a range that is cost effective to implement in an indoor test facility. As mentioned above if probe 102 were to be used to calibrate the far field of the phased array 104 (which, of course, could not be at an infinite distance), without performing some transformation from a near field measurement (as will be discussed in conjunction with the method of FIG. 3), probe 102 would often need to be positioned at a distance away from phased array 104 that would be prohibitively expensive for an indoor measurement facility. Instead, by using the calibration method of FIG. 3, the measurements taken in the near field can be employed to calibrate the far field of phased array 104.

Figure 2:
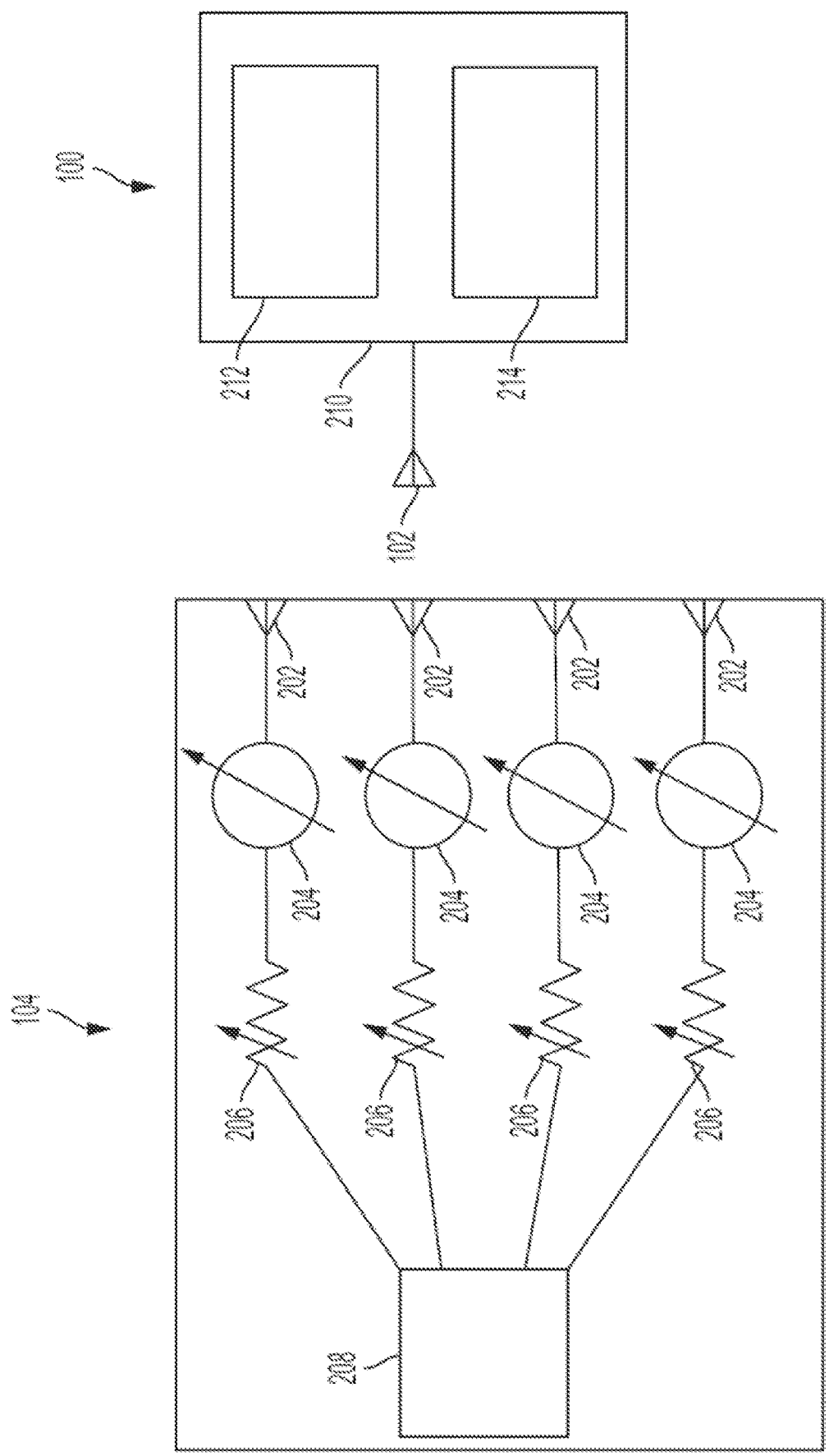
FIG. 2 depicts a simplified schematic of a phased array calibration apparatus and a phased array, according to an example.

FIG. 2 depicts a simplified schematic of phased array 104 and phased array calibration apparatus 100. As shown, phased array 104 comprises an antenna array formed by antenna elements 202, each of which is associated with a respective phase shifter 204 and attenuator 206. Each antenna element receives a signal from a signal generator 208, which is attenuated by attenuator 206 and delayed by phase shifter 204, according to the respective settings of attenuator 206 and phase shifter 204. The attenuators 206 and phase shifters 204 are generally used to adjust and direct the beam formed by the antenna array of phased array 104 on transmit and receive. In addition, attenuators 206 and phase shifters 204 are used to calibrate the antennas elements 202 to account for varieties in the paths from signal generator 208 to each antenna element 202, as will be described further below.

It should be understood that this schematic has been simplified for the purposes of explanation. Indeed, in various examples, phased array 104 can include amplifiers, circulators, filters, various components for processing signals on receive, etc., which have been omitted to avoid needlessly obscuring the inventive aspects.

FIG. 2 also depicts a simplified schematic of phased array calibration apparatus 100. As shown, phased array calibration apparatus 100 includes probe 102, which receives a signal from each antenna element 202 individually (i.e., the antenna under test). The signal from probe 102 is received by computing device 210 and processed according to the steps of method 300 described below. Computing device 210 generally comprises a processor 212 that executes steps of method 300 stored by non-transitory storage medium 214. Computing device 210 can also be configured to adjust phase shifters 202 and attenuators 204 to according to the steps of method 300 in order calibrate phased array 104. Like phased array 104, phased array calibration apparatus 100 is simplified for the purposes of explanation, and in various examples can include amplifiers, filters, etc., to improve the input from probe 102.

Figure 3A:
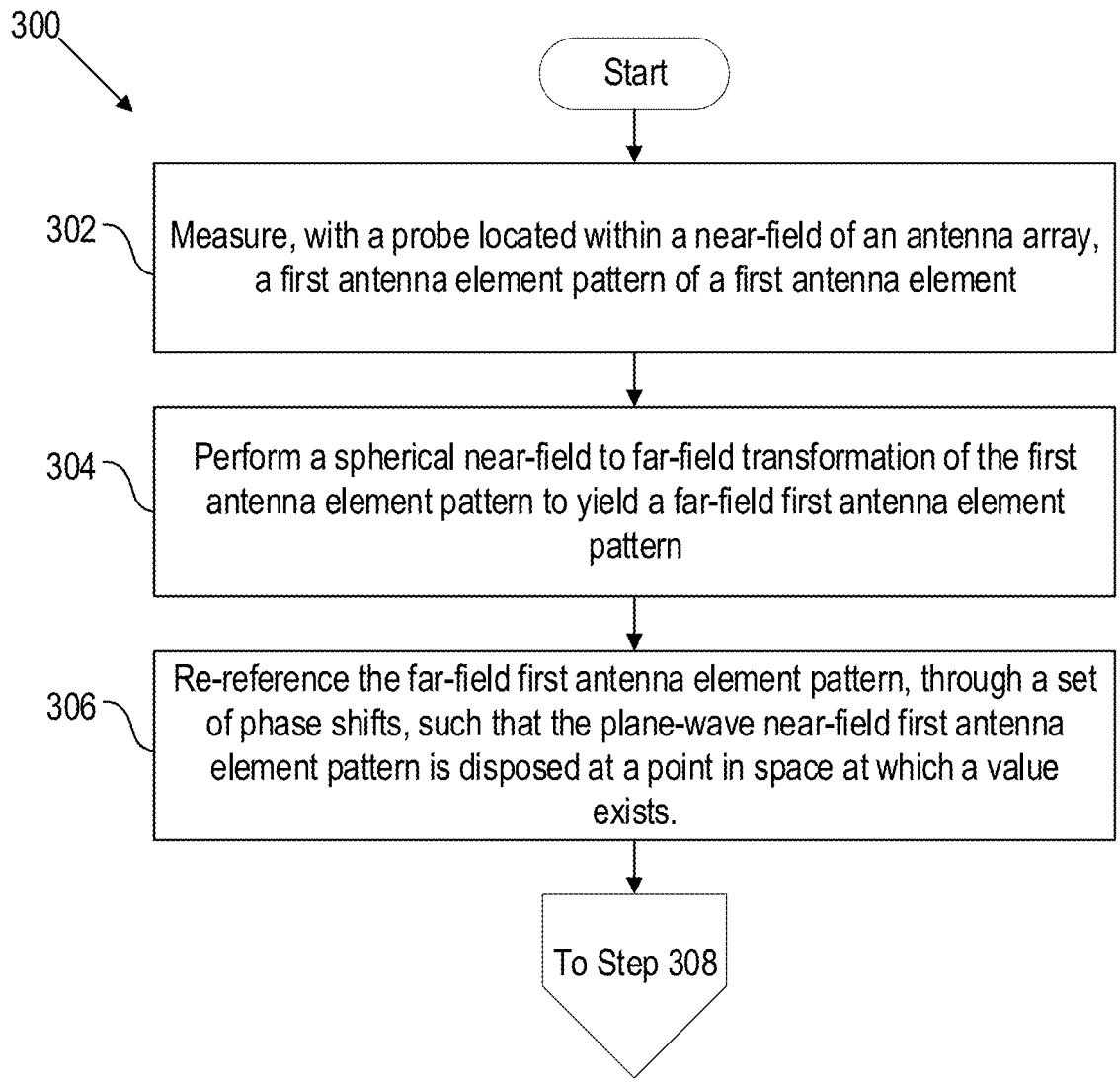
FIG. 3A depicts a flowchart of a method for calibrating a phased array, according to an example.
Figure 3B:
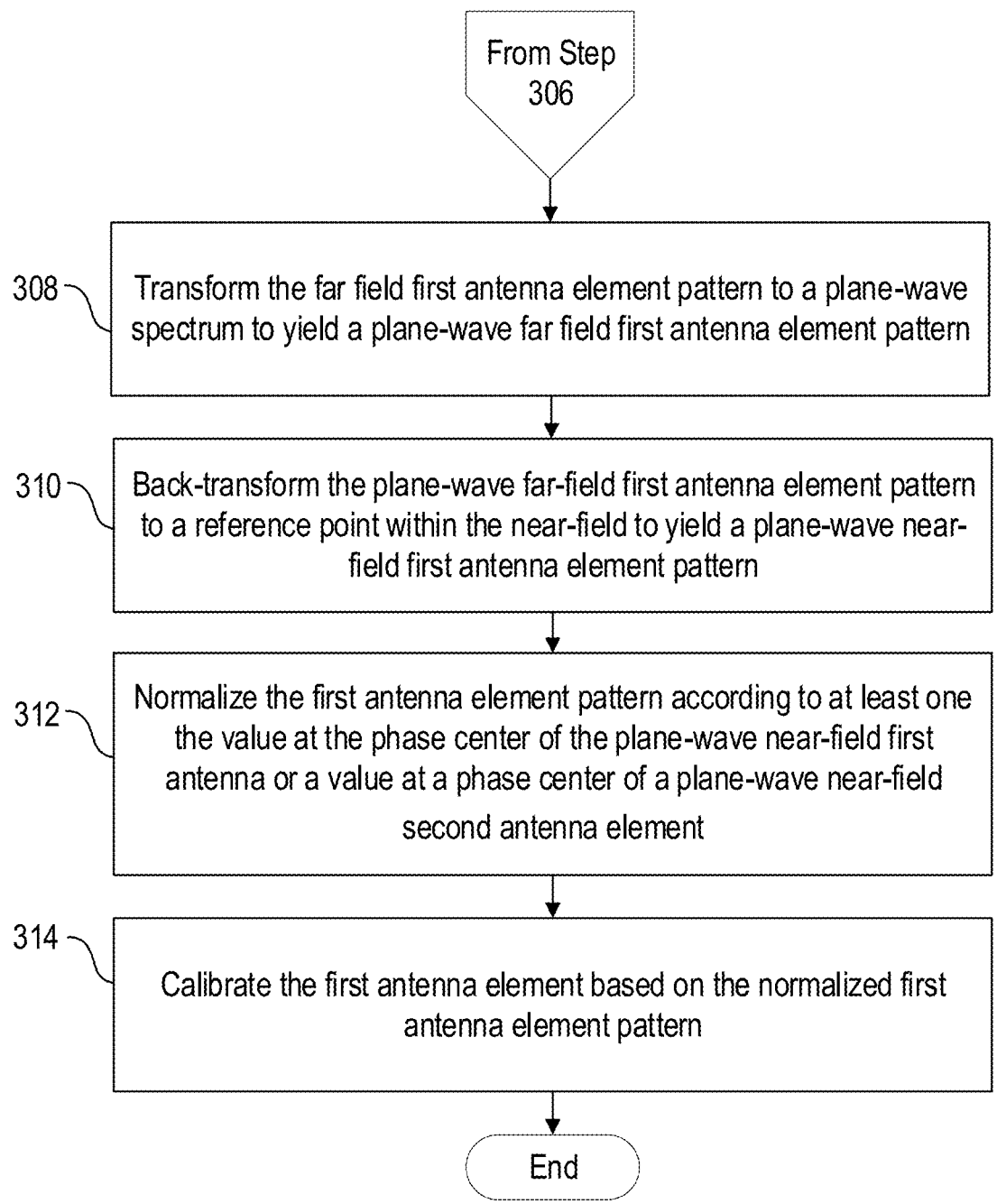
FIG. 3B depicts a flowchart of a method for calibrating a phased array, according to an example.
Figure 3C:
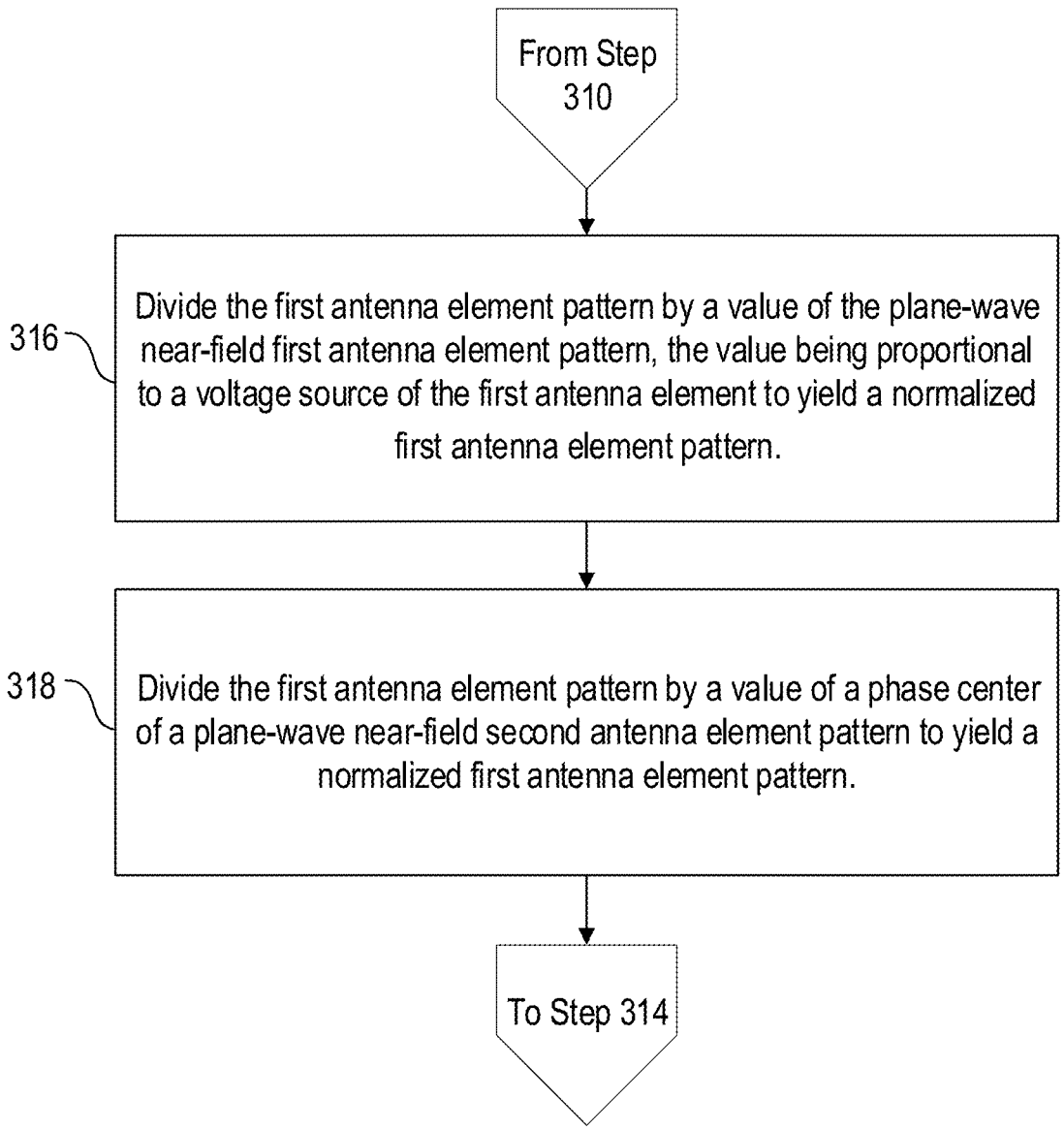
FIG. 3C depicts a flowchart of a method for calibrating a phased array, according to an example

Turning to FIGS. 3A-3C, there is shown a flowchart of a method for calibrating a phased array, such as phased array 104, having an antenna array comprised of a plurality of antenna elements arranged in any arbitrary shape. Method 300 can be implemented by a phased array calibration apparatus, such as phased array calibration apparatus 104. As described above, in an example, the phased array calibration apparatus can comprise a non-transitory storage medium storing program code that, when executed by a processor, performs the steps of method 300.

While method 300 is described for calibrating a single element of a phased array, it should be understood that method 300 is typically performed for each element of the antenna array, such that the entire antenna array is calibrated prior to use. Indeed, various steps of method 300, such as step 318, can be performed using the result of the steps 302-310 for another antenna element of the antenna array.

Beginning at FIG. 3A, at step 302, a probe located within a near-field of the antenna array measures the antenna element pattern of an antenna element of the antenna array (also referred to as the "first antenna element" or the "antenna-under-test"). This step can comprise receiving and recording (either in primary or secondary storage) the signal received from the probe located within the near field of the antenna array, while a test voltage is provided to the antenna element.

At step 304, a spherical near-field to far-field transformation is performed on the measured antenna element pattern, which yields a far-field antenna element pattern of the antenna under test. Stated differently, the result of step 304 is the antenna element pattern of the antenna-under-test extrapolated to the far field of the antenna array.

In an example, the near-field to far-field transformation can involve computing the spherical wave coefficients from the measured near-field pattern and then using those coefficients with the far-field spherical wave expansion function to compute the far-field pattern. For example, one of ordinary skill in the art will understand how to compute the near field to far field transformation in view of the far-field spherical wave expansion equation:

$$\vec{E}(r, \theta, \phi) = \sum_{s=1}^{2}\sum_{n=1}^{N}\sum_{m=-n}^{n} Q_{smn}\vec{K}_{smn}(r, \theta, \phi)$$

where $Q_{smn}$ refers to the spherical wave coefficients, and the far-field spherical wave mode functions are given by:

$$\vec{K}_{1mn}(\theta, \phi) = \sqrt{\frac{2}{n(n+1)}}\left(-\frac{m}{|m|}\right)^m e^{im\phi}(-i)^{n+1}\left\{\frac{im\overline{P}_n^{|m|}(\cos\theta)}{\sin\theta}\hat{\theta} - \frac{d\overline{P}_n^{|m|}(\cos\theta)}{d\theta}\hat{\phi}\right\}$$

$$\vec{K}_{2mn}(\theta, \phi) = \sqrt{\frac{2}{n(n+1)}}\left(-\frac{m}{|m|}\right)^m e^{im\phi}(-i)^{n}\left\{\frac{d\overline{P}_n^{|m|}(\cos\theta)}{d\theta}\hat{\theta} + \frac{im\overline{P}_n^{|m|}(\cos\theta)}{\sin\theta}\hat{\phi}\right\}$$

At step 306, the far-field antenna element pattern is referenced, through a set of phase shifts, such that the result of step 310 is disposed at a point in space at which a value exists. As will be described below, steps 308 and 310 respectively transform the far field antenna element pattern to a plane-wave spectrum (the result of which is referred to in this disclosure as the plane-wave antenna element pattern) and then transform it to the face of the antenna array (the result of which is referred to in this disclosure as the near-field plane-wave antenna element pattern), which can be a location that results from the referencing of step 306. Specifically, the step of transforming back to a near-field pattern (step 310) offers only limited resolution, with values located on a grid, separated by some function of wavelength (e.g., λ/2). Thus, at step 306, the far-field antenna element pattern is phase shifted to a point at which the value of the transformed near field at step 310 will exist: that is, the far-field antenna element pattern is phase shifted so that the plane-wave near-field first antenna element pattern produced in step 310 is at some point on the grid of points that are yielded by that step.

In certain examples, the point at which the value exists can be the same for each antenna element, as method 300 is repeated. Stated differently, as method 300 is performed for each antenna element, each element can be phase shifted to same point in space for which a value exists in step 310. In certain examples, this point can be the center of a coordinate system employed by the phased array calibration apparatus. The phase shift applied to each element will depend on the relative location of the element in space (an alignment procedure can be used to first locate the element or to otherwise ensure its location is known so that the appropriate phase shift can be applied).

However, it is not necessary that each element is re-referenced to the same point in space. In alternative examples, different values on the grid of values in step 310 can be used for the patterns of different antenna elements.

In alternative examples, method 300 can be performed without performing step 306, that is, without re-referencing the far-field antenna element pattern to value that exists in step 310. The result of this is that data is lost in step 310 for each value that is not the grid of values. This data will need to be estimated, by, for example, interpolating between values on the grid, which, as an estimation, will necessarily have some degree of inaccuracy, and will fail to capture maxima and minima that occur between grid points.

Turning to FIG. 3B, at step 308, the far-field first antenna element pattern is transformed to the plane-wave spectrum, yielding a plane-wave far field first antenna element pattern.

(Note that this step can be performed on a far-field first antenna element pattern that has or has not been re-referenced in step 306.) Transforming to a plane-wave spectrum allows the back transformation of step 310 yield a value directly at the element of the antenna-under-test (or to its phase-shifted location, resulting from step 306). Absent transforming the far-field antenna element pattern to the plane-wave spectrum, the spherical back transformation of step 310 would be limited by the minimum sphere—the smallest sphere that completely encloses the antenna under test—preventing the back transformation from accurately yielding the pattern at the element. One of ordinary skill in the art will understand how to convert the far-field electric field components to the plane wave spectrum in view of the following equation:

$$f_x = \frac{E_\theta \cos\phi \cos\theta - E_\phi \sin\phi}{\cos\theta}$$

$$f_y = \frac{E_\theta \cos\theta \sin\phi + E_\phi \cos\phi}{\cos\theta}$$

Applicant has recognized that the calculation required for this step is far simpler and more efficient for patterns that have been first transformed to the far field than those remaining in near field. Performing this calculation in the far-field thus results in greater computational efficiency and a faster calibration process than attempting to perform this calculation in the near field directly from the measured antenna element pattern.

At step 310, as described above, plane-wave far-field antenna element pattern is transformed back to the near-field to yield a plane-wave near-field first antenna element pattern. If the far-field antenna element pattern was re-referenced in step 306, the back transformation is guaranteed to yield a value within the resolution grid. The back transformation of step 310 transforms the plane-wave far-field antenna element pattern back to the face the antenna array at the location of the element under test or to its re-referenced location. The resulting complex value at the phase center of the plane-wave near-field first antenna element pattern is proportional to the voltage seen at the antenna under test, which is representative of the unique path response of that element.

One of ordinary skill in the art will understand how to transform the place-wave spectrum back to the face of the array in view of the following equations:

$$E_{xa}(x, y, z) = \frac{1}{4\pi^2} \int_{-\infty}^{\infty} \int_{-\infty}^{\infty} f_x(k_x, k_y) e^{-j(k_x x + k_y y)} e^{-jk_z z} dk_x dk_y$$

$$E_{ya}(x, y, z) = \frac{1}{4\pi^2} \int_{-\infty}^{\infty} \int_{-\infty}^{\infty} f_y(k_x, k_y) e^{-j(k_x x + k_y y)} e^{-jk_z z} dk_x dk_y$$

These equations can be efficiently implemented with an FFT (Fast Fourier transform) or IFFT (inverse Fast Fourier transform) depending on the sign convention of the measured data. The z parameter in the equations below can be adjusted if the element phase centers are not located exactly at z=0.

Figure 4:
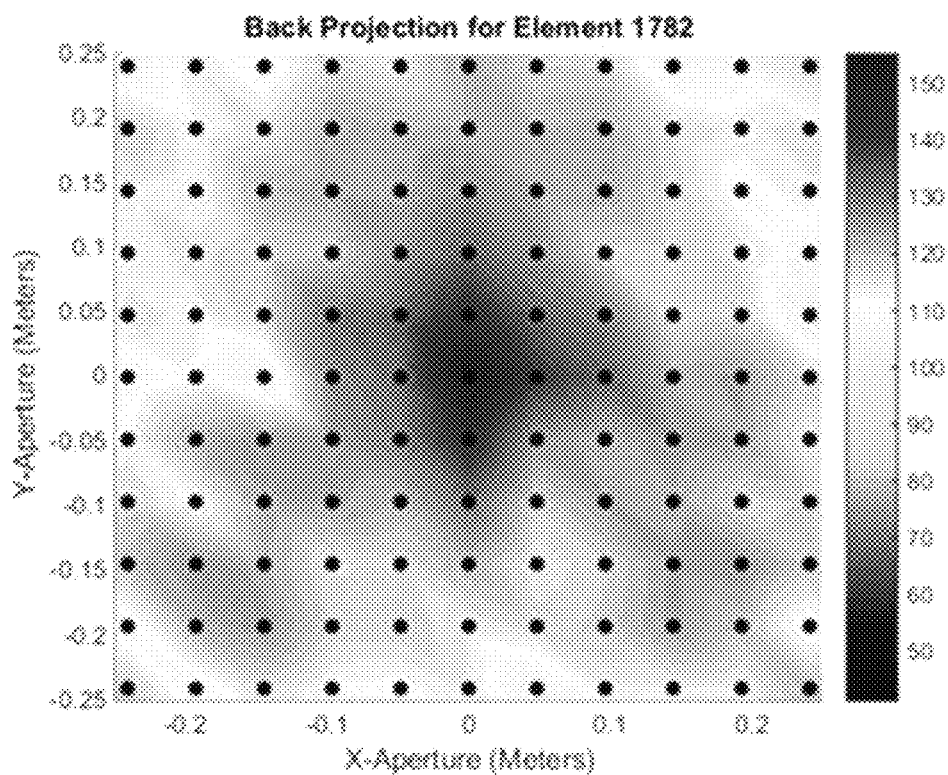
FIG. 4 depicts the back projected field of a single element, according to an example.

FIG. 4 depicts the result of the back transformation of step 310, as a power distributed over space. Because an antenna element pattern exists in three-dimensional space, FIG. 4 depicts a cross-section of the antenna element pattern that crosses through the re-referenced location of coordinate origin at 0,0. As shown, the power of the antenna element is greatest at the coordinate origin.

At step 312, the antenna element pattern of the antenna under test is normalized according to at least one of the value at the phase of the plane-wave near-field first antenna or a value at a phase center of a plane-wave near-field second antenna element. These will be discussed in more detail in steps 316 and 318 described below.

Turning to FIG. 3C there is shown steps 316 and 318, two methods of normalizing the antenna element pattern of the antenna under test.

At step 316, the antenna-under-test is normalized by dividing the first antenna element pattern by the value of the plane-wave near-field first antenna element pattern found in step 310. As described in step 310, this value is effectively representative of the path length of the first antenna element and is proportional to the voltage source of the first antenna element. Dividing the first antenna element pattern by this value effectively results in dividing the path response of the element out of the pattern.

At step 318, the antenna-under-test is normalized by dividing the first antenna element pattern by a value of a phase center of a plane-wave near-field second antenna element pattern. Typically, the value of the second antenna element pattern, as mentioned above, is the result of performing steps 302-310 on the second antenna element. Here, the "second antenna element" is an antenna element of the antenna array other than the first antenna element that is selected as a reference element.

The second antenna element is selected, in an example, as the reference element from the remaining antenna elements according to the magnitude of the value of the phase center of a plane-wave near-field second antenna element pattern relative to the values of the phase centers of the remaining elements. Stated differently, steps 302-310 are performed on each antenna element and the resulting values are compared to select a reference element.

Antenna elements with a phase center value greater in magnitude than the magnitude of the reference element will be brought down, through division, to that magnitude; whereas, all elements with a magnitude less than the reference element are left unchanged, since their gain cannot be increased. This effectively sets a uniform weighting function for all elements with values having magnitudes above the magnitude of the reference element. In this way, the reference element can be conceived of as having a magnitude of 1 and 0 phase.

Generally, an antenna element is selected as a reference element by balancing the desired gain and SNR against the accuracy of achieving the desired weighting function. Setting a reference element with a high magnitude relative the remaining elements will result in good gain and SNR (since most elements are not attenuated to reduce their gain) but poor accuracy of achieving the desired weighting function. Setting as a reference element an element with a low magnitude relative the remaining elements will result in the opposite problem: high accuracy achieving the desired weighting function but at the cost of gain and SNR.

Figure 5:
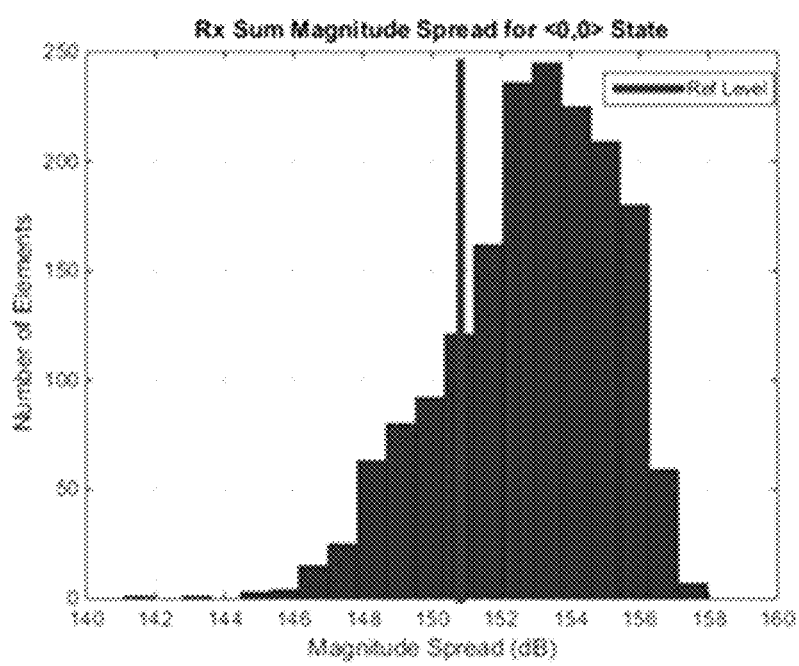
FIG. 5 depicts a magnitude distribution across the array for the max-gain state, according to an example.

FIG. 5 shows the result of performing steps 302-310 on each antenna element of the array and tabulating the magnitudes of each into a bar graph. FIG. 5 thus shows the distribution of the magnitudes of each antenna element for the max-gain state. In this example, an element with a magnitude of 151 dB is selected as the reference element to balance the concerns listed above.

Although FIG. 3C depicts both steps 316 and 318, it should be understood that both steps need not be performed for a given calibration. Indeed, in certain examples only step 316 or step 318 can be performed as the normalization. In addition, even where both steps are performed, the order of steps 316 and 318 can be reversed, such that step 318 can be performed before step 316. Thus, where, as shown in FIG. 3C, the result of the first normalization of step 316 is then normalized again in step 318, this can be reversed so that the result of the normalization of step 318 is normalized by step 316.

Returning to FIG. 3B, the first antenna element is calibrated, through adjustments to at least one of the phase shifter and attenuator associated with the first antenna, according to, at least, the result of the normalization of step 312. Generally, the goal of calibration is to measure each of the element paths and to measure how the paths change across all attenuator and phase shifter settings, so that proper attenuation and phase settings can be implemented for a desired magnitude distribution and phase progression across the array. By characterizing the path lengths for each element in the above steps, the actual required settings to arrive at the desired magnitude distribution and phase progression across the array can be determined.

Finally, as mentioned above, although the flowchart of method 300 depicts only a single antenna under test, it should be understood that these steps are typically performed for each element of the array to complete the calibration.

The above-described method provides a method of calibrating an antenna array, and, consequently, phased array, having any arbitrary shape. More specifically, the above-described method provides a computationally and processing efficient method to calibrate an antenna array by taking measurements using a probe within a spherical chamber and in the near-field.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for calibrating a phased array including an antenna array comprising a plurality of antenna elements, comprising the steps:
   measuring with a probe a first antenna element pattern of a first antenna element of the plurality of antenna elements;
   performing a spherical near-field to far-field transformation of the first antenna element pattern to yield a far-field first antenna element pattern;
   transforming the far-field first antenna element pattern to a plane-wave spectrum to yield a plane-wave far-field first antenna element pattern;
   back transforming the plane-wave far-field first antenna element pattern to a reference point within the near-field of the antenna array to yield a plane-wave near-field first antenna element pattern, wherein the reference point within the near-field is selected such that a value at a phase center of the plane-wave near-field first antenna element pattern is representative of a voltage source of the first antenna element;
   normalizing the first antenna element pattern according to, at least, the value at the phase center of the plane-wave near-field first antenna element pattern to yield a normalized first antenna element pattern; and
   calibrating the first antenna element based, at least in the part, on the normalized first antenna element pattern.

2. The method of claim 1, wherein the first antenna element pattern is normalized according to the value at the phase center of the plane-wave near-field first antenna element pattern and a value of a phase center of a plane-wave near-field second antenna element pattern of a second antenna element of the plurality of antenna elements to yield the normalized first antenna element pattern.

3. The method of claim 1, wherein calibrating the first antenna element comprises adjusting an attenuator associated with the first antenna element.

4. The method of claim 1, wherein calibrating the first antenna element comprises adjusting a phase shifter associated with the first antenna element.

5. The method of claim 1, further comprising the step of, before the step of back transforming, re-referencing the far-field first antenna element pattern, through a set of phase shifts, such that the plane-wave near-field first antenna element pattern is disposed at a point in space at which a value exists.

6. The method of claim 5, wherein the point in space is a coordinate origin.

7. A method for calibrating a phased array including an antenna array comprising a plurality of antenna elements, comprising the steps:
   measuring with at least one probe a plurality of antenna element patterns, each antenna element pattern being produced by a respective antenna element of the plurality of antenna elements;
   performing a spherical near-field to far-field transformation of each of the plurality of antenna element patterns to yield a plurality of far-field antenna element patterns;
   transforming each of the plurality of far-field antenna element patterns to a plane-wave spectrum to yield a plurality of plane-wave far-field antenna element patterns;
   back transforming each of the plane-wave far-field antenna element pattern to a reference point within the near-field of the antenna array to yield a plurality of plane-wave near-field first antenna element patterns, wherein the reference point within the near-field is selected for each of the near-field antenna element patterns such that a value at a phase center of each plane-wave near-field antenna element pattern is representative of a voltage source of the respective antenna element of the plurality of antenna elements;

selecting, as a reference value, a value at a phase center of a plane-wave near-field antenna element pattern of the plurality of plane-wave near-field antenna element patterns;

normalizing each of the plurality of antenna element patterns according to, at least, the reference value to yield a plurality of normalized antenna element patterns; and calibrating each antenna element based, at least in the part, on a respective normalized antenna element pattern of the plurality antenna patterns.

8. The method of claim 7, wherein each of the plurality of antenna element pattern is normalized according to the reference value and the value at the phase center of the respective plane-wave near-field antenna element pattern to yield the plurality of normalized antenna element patterns.

9. The method of claim 7, wherein calibrating each antenna element comprises adjusting an attenuator associated with the antenna element.

10. The method of claim 7, wherein calibrating each antenna element comprises adjusting a phase shifter associated with the antenna element.

11. The method of claim 7, further comprising the step of, before the step of back transforming, re-referencing each of the plurality of far-field antenna element patterns, through a set of phase shifts, such that each plane-wave near-field first antenna element pattern is disposed at a point in space at which a value exists.

12. The method of claim 11, wherein the point in space is a coordinate origin.

13. A non-transitory storage medium storing program code that, when executed by a processor, calibrates a phased array including an antenna array comprising a plurality of antenna elements, comprising the steps:

receiving, from a probe, a measurement representing a first antenna element pattern of a first antenna element of the plurality of antenna elements;

performing a spherical near-field to far-field transformation of the first antenna element pattern to yield a far-field first antenna element pattern;

transforming the far-field first antenna element pattern to a plane-wave spectrum to yield a plane-wave far-field first antenna element pattern;

back transforming the plane-wave far-field first antenna element pattern to a reference point within the near-field of the antenna array to yield a plane-wave near-field first antenna element pattern, wherein the reference point within the near-field is selected such that a value at a phase center of the plane-wave near-field first antenna element pattern is representative of a voltage source of the first antenna element;

normalizing the first antenna element pattern according to, at least, the value at the phase center of the plane-wave near-field first antenna element pattern to yield a normalized first antenna element pattern; and calibrating the first antenna element based, at least in the part, on the normalized first antenna element pattern.

14. The non-transitory storage medium of claim 13, wherein the first antenna element pattern is normalized according to the value at the phase center of the plane-wave near-field first antenna element pattern and a value of a phase center of a plane-wave near-field second antenna element pattern of a second antenna element of the plurality of antenna elements to yield the normalized first antenna element pattern.

15. The non-transitory storage medium of claim 13, wherein calibrating the first antenna element comprises adjusting an attenuator associated with the first antenna element.

16. The non-transitory storage medium of claim 13, wherein calibrating the first antenna element comprises adjusting a phase shifter associated with the first antenna element.

17. The non-transitory storage medium of claim 13, further comprising the step of, before the step of back transforming, re-referencing the far-field first antenna element pattern, through a set of phase shifts, such that the plane-wave near-field first antenna element pattern is disposed at a point in space at which a value exists.

18. The non-transitory storage medium of claim 17, wherein the point in space is a coordinate origin.

* * * * *